United States Patent [19]
Nomura

[11] Patent Number: 5,221,993
[45] Date of Patent: Jun. 22, 1993

[54] ANNULAR OPTICAL MEMBER

[75] Inventor: Hiroshi Nomura, Tokyo, Japan

[73] Assignee: Asahi Kogaku Kogyo Kabushiki Kaisha, Tokyo, Japan

[21] Appl. No.: 630,085

[22] Filed: Dec. 19, 1990

[30] Foreign Application Priority Data

May 25, 1990 [JP] Japan .................. 2-54883[U]

[51] Int. Cl.$^5$ .............................................. G02B 27/00
[52] U.S. Cl. ..................... 359/601; 359/823; 359/699
[58] Field of Search ............... 359/819, 693, 694, 699, 359/700, 701, 702, 705, 707, 823, 601, 611; 76/29, 30; 425/191, 588

[56] References Cited

U.S. PATENT DOCUMENTS 3,931,629  1/1976  Himmelsbach et al. ........ 354/195.1
4,389,098  6/1983  Fukushima .................... 359/699
5,018,832  5/1991  Terunuma et al. ............. 359/601

FOREIGN PATENT DOCUMENTS 60-252319  12/1985  Japan .
2229016    9/1990  United Kingdom .

OTHER PUBLICATIONS

Patent Abstracts of Japan, vol. 10, No. 127, Publication No. 60-252,319-May 13, 1986.

Primary Examiner—Loha Ben
Attorney, Agent, or Firm—Sandler Greenblum & Bernstein

[57] ABSTRACT

An annular optical member of synthetic resin is provided, having a bottomed inner groove on an inner peripheral surface thereof, wherein the bottom of the bottomed inner groove has a rough surface which defines an inner anti-reflection surface.

10 Claims, 2 Drawing Sheets

ANNULAR OPTICAL MEMBER

BACKGROUND OF THE INVENTION

1. Field of the Invention

The present invention relates to an annular optical member made of synthetic resin and, more precisely, it relates to an annular optical member which is provided on its inner surface with a bottomed inner groove.

2. Description of the Related Art

The cam ring of a zoom lens is usually provided on its peripheral surface with a cam groove in which an association pin of a movable lens group, which is movable in the optical axis direction, is fitted, so that the rotation of the cam ring causes the movable lens group to move in the optical axis direction and effect the zooming.

In a conventional cam ring made of metal, the cam groove is usually in the form of through grooves which extend completely through the cam ring. A cam ring made of synthetic resin has also been known to be used, in which the cam groove is a bottomed inner cam groove. Using molded products (e.g., cam rings made) of synthetic resin can reduce manufacturing costs because, unlike a through cam groove which must be covered by a separate light intercepting member provided on the outer surface thereof, the bottomed inner cam groove does not require such a separate light intercepting member. Furthermore, the bottomed cam groove does not significantly reduce the strength of the cam ring, in comparison with the use of a through cam groove.

A die for molding a cam ring having a bottomed cam groove has a projection corresponding to the bottomed cam groove. The projection of the molding die is made, as smoothly as possible, in accordance with the cam profile. To this end, the bottomed cam groove has smooth side (right and left) cam profile surfaces, as well as a smooth bottom surface. However, it has been found that the smooth bottom surface causes inner reflections within the lens.

SUMMARY OF THE INVENTION

The primary object of the present invention is to eliminate the above-mentioned drawbacks of the inner reflection due to the bottom surface of the bottomed inner cam groove.

In practice, only the side wall surfaces of the cam groove must be smooth and the bottom surface can be a rough finished surface.

One of the most significant features of the present invention addresses the rough finished finish bottom surface of the bottomed cam groove.

If an inner cam groove of an annular metal blank is mechanically cut by a rotating cutter, the bottom of the inner cam groove thus formed is inevitably a smooth surface. However, in the case of a plastic mold, a rough bottom surface can be easily formed by a molding die which has a projection with a rough surface, corresponding to the bottom of the cam groove. The term "rough surface" means a rough surface which can prevent a harmful inner reflections in an optical instrument. The rough surface can comprise, for example, a group of generally V-shaped light intercepting ridges which are widely used in optical devices. The light intercepting ridges are preferably provided on the inner peripheral surface of an annular member to extend in a direction substantially perpendicular to the optical axis.

Since the inner anti-reflecting rough surface, according to the present invention, can be easily formed by a synthetic resin mold, no increase in manufacturing cost is necessary.

The use of the present invention is not limited to a cam ring and can be applied to any annular optical element, such as a lens hood, or guide rings, etc. The inner groove can be either linear or non-linear, and the function thereof matters little to the present invention.

The present disclosure relates to subject matter contained in Japanese utility model application No. 2-54883 (filed on May 25, 1990) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
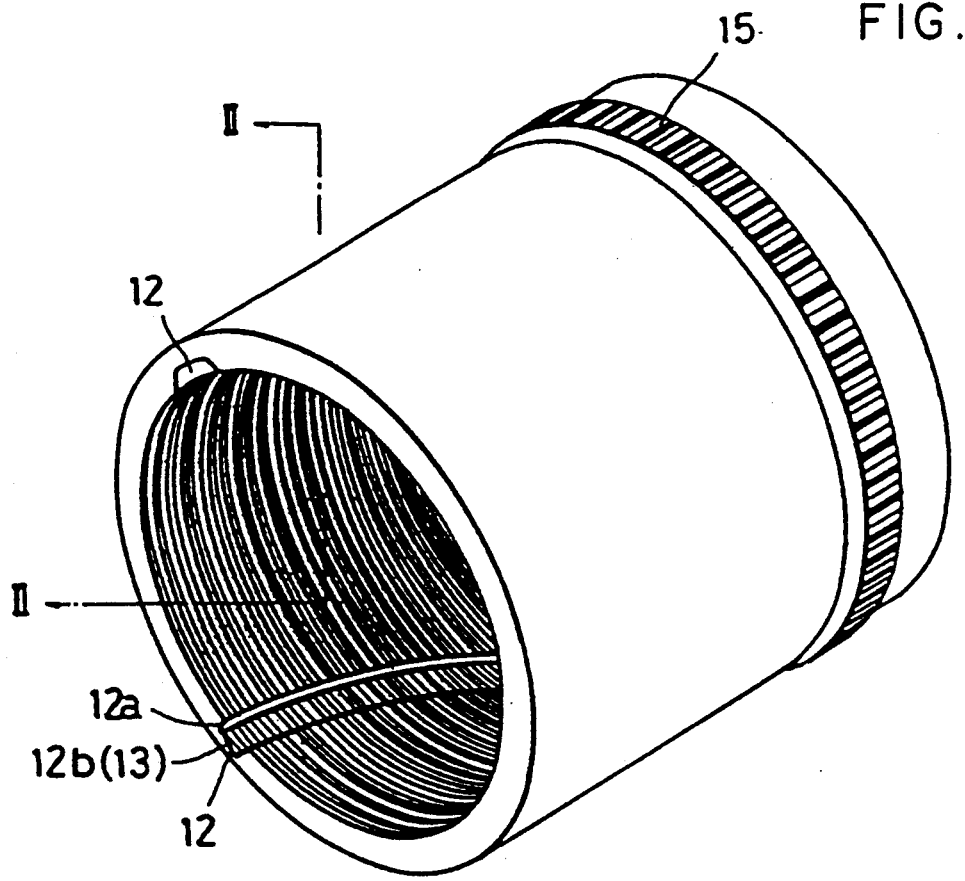
FIG. 1 is a perspective view of a cam ring according to the present invention.
Figure 2:
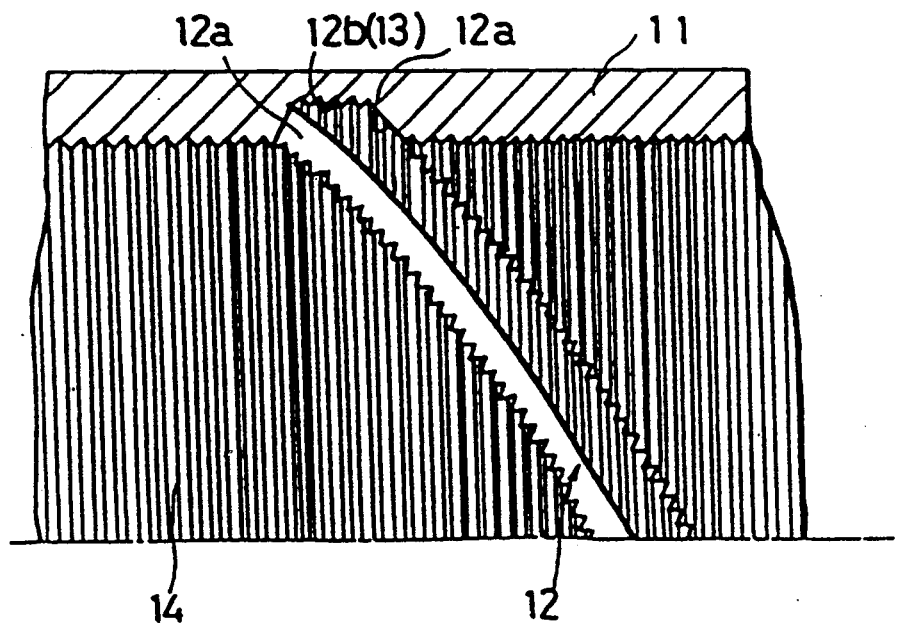
FIG. 2 is a partial sectional view taken along the line II—II in FIG. 1.

A cam ring 11 which is made of synthetic resin mold has a bottomed inner cam groove 12 formed on an inner peripheral surface thereof, as shown in FIGS. 1 and 2. The inner cam groove 12 has right and left side cam profile surfaces 12a and a bottom surface 12b. The cam profile surfaces 12a are tapered surfaces having a draft which is used upon molding. One of the most important features of the present invention is directed to the bottom surface 12b, which is a rough surface comprising a group of generally V-shaped light intercepting ridges (projections and depressions) 13 which define an anti-reflecting surface. The cam ring 11 is provided on its inner peripheral surface with similar projections and depressions forming light intercepting ridges 14. The cam ring 11 has an annular gear 15 which is formed on the outer peripheral surface, integral therewith, to rotate the cam ring 11. The ridges 13 and 14 lie in planes perpendicular to the optical axis of the cam ring 11.

Figure 3:
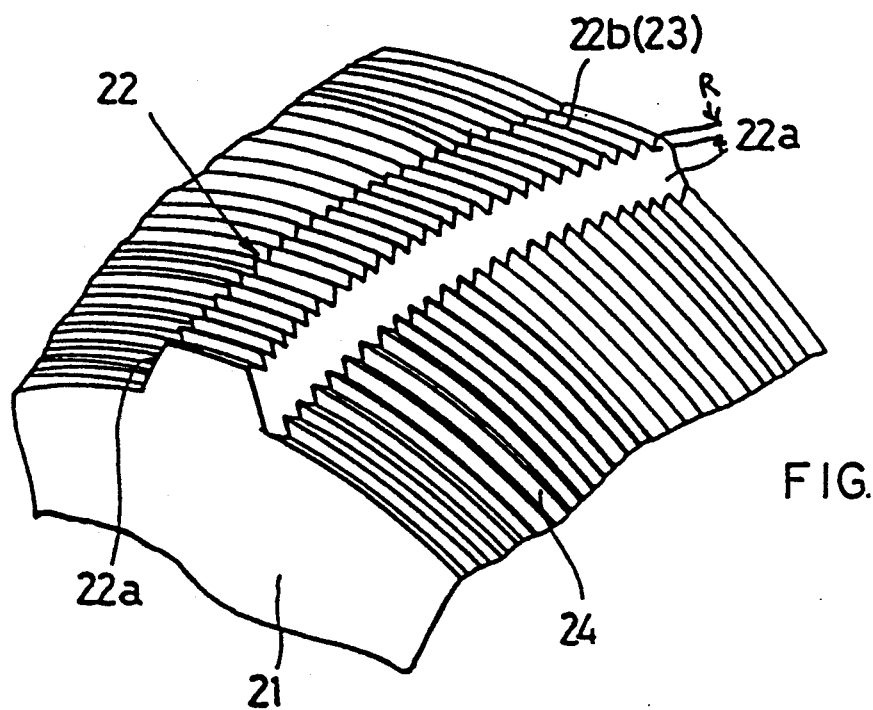
FIG. 3 is a perspective view of a molding die which is used to mold a cam ring according to the present invention.

A separable inner molding die 21, of the molding dies used for molding the cam ring 11, has a continuous projection 22 for forming (molding) the inner cam groove 12, as shown in FIG. 3. The continuous projection 22 has side smooth, cam profile surfaces 22a corresponding to the smooth cam profile surfaces 12a and a rough top surface 23 comprising generally V-shaped projections and depressions 22b that corresponds to the light intercepting ridges 13 (bottom surface 12b). The inner molding die 21 is provided on an outer surface of the body thereof with generally V-shaped light intercepting ridges (projections and depressions) 24 corresponding to the light intercepting ridges 14.

Figure 4:
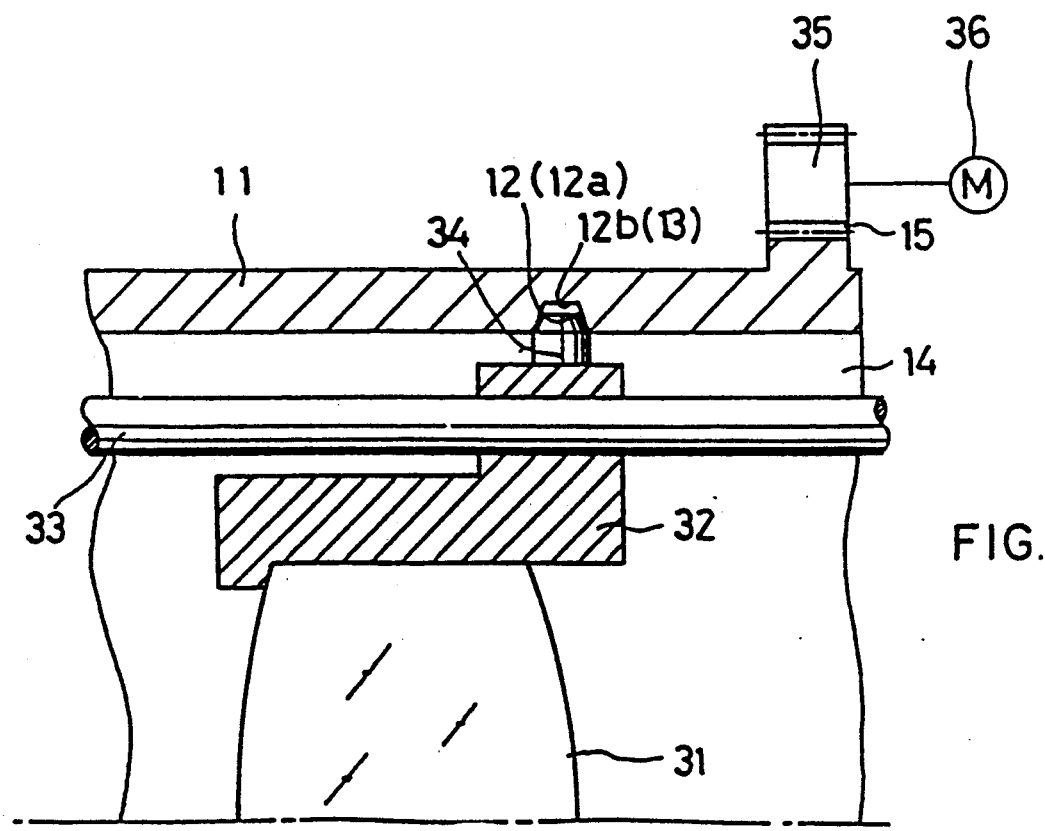
FIG. 4 is a longitudinal sectional view of a part of a zoom lens having a cam ring incorporated therein, shown in FIG. 1.

FIG. 4 is a partial conceptual view of a zoom lens having the cam ring 11 shown in FIGS. 1 and 2. A lens frame 32, having a variable power lens 31, is supported to move in the optical axis direction along and by a linear movement guide rod 33. The lens frame 32 has a radially projecting tapered pin (cam pin) 34 which is fitted in the inner cam groove 12 of the cam ring 11. The inner cam groove 12 opens, at least at its one end, into the end face of the cam ring 11, so that the tapered pin 34 can be inserted in the inner cam groove 12 from the open end. The tapered pin 34 has a truncated conical front end which comes into contact with the side faces 12a of the cam groove 12, but does not come into contact with the bottom 12b of the cam groove 12. Consequently, when the cam ring 11 is rotated by a motor 36, through a pinion 35, which is functionally connected to the motor 36 and which engages the gear 15 in the forward and reverse directions, the lens frame 32, and accordingly, the variable power lens 31 move in the optical axis direction along the cam profile of the inner cam groove 12. In the illustrated embodiment, although only one variable power lens (first lens group) 31 is shown, only for clarification, there are usually two or more variable power lens groups, so that the lens groups are moved in relation to each other, with a predetermined relationship, in the optical axis direction to effect zooming operation.

According to the present invention, even if light, which passes through the variable power lens 31, impinges upon the bottom surface 12b of the inner cam groove 12 of the cam ring 11, the light is diffusely reflected by the light intercepting ridges 13 of the bottom surface 12b, so that no harmful light reaches the film plane. Thus, any image formed on the film plane is not influenced by the harmful light.

To prevent harmful inner reflections, the "inner anti-reflecting rough surface" formed on the bottom surface 12b of the inner cam groove 12 has, for example, a surface roughness equal to or more than Rmax=10 μm. R is defined by the distance between the bottom of a depression and the top of an adjacent projection, as shown in the die of FIG. 3 (the distance R is similarly defined by the distance between depression bottom and projection top in a cam ring made by such a die). The extent of surface roughness as mentioned above can be realized by the projections and depressions which are formed on the top surface of the projection 22 of the molding die 21 by an etching process. Note that for the same Rmax, the anti-reflecting effect increases as the angle between the ridges and the roots of the threads decrease. In other words, the smaller the angle is at the bottom of each depression, the greater the anti-reflection effect. It is considered that the anti-reflection effect can be obtained by repeated diffusion reflections, thus resulting in a decrease in light intensity rather than the elimination of the reflection itself. Namely, the shape of the rough surface of the bottom 12b of the inner cam groove can be determined so as to prevent primary and secondary reflected lights from directly reaching the film plane. The generally V-shaped light intercepting ridges 13 of the bottom surface 12b contribute to a more effective anti-reflection effect.

Although the above discussion has been directed at the cam ring 11 having the inner cam groove 12, the present invention can be applied, for example, to an annular member having a linear movement guide inner groove or lens hood, etc, as well.

I claim:

1. A zoom lens comprising a rotatable cam ring which is provided on its inner peripheral surface with a bottomed inner cam groove, and a lens frame which has a cam pin which can be fitted in the inner cam groove of the cam ring, so as to move in an optical axis direction of the zoom lens, wherein the bottom of the bottomed inner cam groove has a rough surface which defines an inner anti-reflection surface.

2. A zoom lens according to claim 1, wherein said cam pin has a front end which does not come into contact with the bottom of the inner cam groove when the cam pin is fitted in the inner cam groove of the cam ring.

3. A zoom lens according to claim 1, wherein said cam pin is a tapered pin having a conical front end.

4. A zoom lens according to claim 3, wherein said inner cam groove has tapered side cam profile, wall surfaces corresponding to the tapered cam pin.

5. A die for molding an optical member having a bottomed inner groove on an inner peripheral surface thereof, comprising a cylindrical member having a continuous projection, wherein said projection comprises smooth side cam profile surfaces and a rough top surface having a roughness of at least around 10 micrometers.

6. The die of claim 5 wherein said rough top surface comprises V-shaped projections and depressions.

7. The die of claim 6, wherein said V-shaped projections and depressions are formed by etching.

8. A method of molding a rotatable cam ring for a zoom lens comprising:
   providing a die comprising a cylindrical member having a continuous projection comprising smooth side cam profile surfaces and a rough top surface for forming said cam ring with an inner cam groove so as to move in an optical axis direction of the zoom lens when fitted with a cam pin; and
   molding said rotatable cam ring to have a bottomed inner cam groove on its inner peripheral surface, by applying uncured synthetic resin to said die and allowing said synthetic resin to cure, wherein the bottom of the bottomed inner cam groove has a rough surface which defines an anti-inner reflection surface.

9. The method of claim 8, further comprising forming the rough surface of the bottom of the bottomed inner cam groove to have V-shaped projections and depressions.

10. The method of claim 8, further comprising forming the rough surface of the bottom of the bottomed inner cam groove to have a surface roughness of at least around 10 micrometers.

* * * * *

UNITED STATES PATENT AND TRADEMARK OFFICE
CERTIFICATE OF CORRECTION

PATENT NO. : 5,221,993
DATED : June 22, 1993
INVENTOR(S) : H. NOMURA

It is certified that error appears in the above-indentified patent and that said Letters Patent is hereby corrected as shown below:

Column 4, line 21 (claim 4, line 2), after "tapered" insert —,—.

Signed and Sealed this

Twenty-third Day of August, 1994

Attest:

BRUCE LEHMAN

Attesting Officer     Commissioner of Patents and Trademarks